US006634138B2

(12) United States Patent
Katzman

(10) Patent No.: US 6,634,138 B2
(45) Date of Patent: Oct. 21, 2003

(54) SELF-SUSTAINING INDOOR WATERFALL PLANTER

(76) Inventor: Richard Jed Katzman, 55 Rowayton Ave., Rowayton, CT (US) 06853

( * ) Notice: Subject to any disclaimer, the term of this patent is extended or adjusted under 35 U.S.C. 154(b) by 0 days.

(21) Appl. No.: 09/752,380

(22) Filed: Dec. 28, 2000

(65) Prior Publication Data
US 2002/0084346 A1 Jul. 4, 2002

(51) Int. Cl.7 .......................... A01G 25/00; B05B 17/08
(52) U.S. Cl. ................... 47/79; 47/82; 47/62 R; 47/66.6; 239/23; 239/12; 239/16; 239/22
(58) Field of Search ................ D30/121, 101, D30/105, 106, 107; D25/2; D23/201, 13; 239/23, 12, 16–22; 47/79–83, 47, 66.6, 67, 59, 62 R, 62 E, 63, 64; 210/255, 262

(56) References Cited

U.S. PATENT DOCUMENTS

| | | | | |
|---|---|---|---|---|
| 3,409,223 A | * | 11/1968 | Gosh | 239/12 |
| 3,841,023 A | * | 10/1974 | Carlyon, Jr. | 239/20 |
| 4,111,363 A | * | 9/1978 | Kawamura et al. | 239/17 |
| 4,178,716 A | * | 12/1979 | Harper et al. | 147/62 |
| D255,142 S | | 5/1980 | Abbott | |
| D255,144 S | | 5/1980 | Abbott | |
| 4,747,538 A | | 5/1988 | Dunn et al. | |
| 4,836,142 A | | 6/1989 | Duback | |
| 5,066,394 A | | 11/1991 | Harrison | |
| 5,326,032 A | | 7/1994 | Quillin | |
| 5,440,836 A | * | 8/1995 | Lee | 47/59 R |
| 5,501,178 A | | 3/1996 | Kemp | |
| 5,502,922 A | * | 4/1996 | Shlomo | 47/39 |
| 5,571,409 A | * | 11/1996 | Scarborough | 210/169 |
| 5,598,662 A | * | 2/1997 | Droste | 47/39 |
| 5,637,361 A | * | 6/1997 | Scheurich | 362/96 |
| 5,899,634 A | | 5/1999 | Lochtefeld | |
| 5,911,927 A | | 6/1999 | Roberts | |
| 6,149,070 A | * | 11/2000 | Hones | 239/16 |
| 6,149,991 A | * | 11/2000 | Okuda | 119/245 |
| D435,630 S | * | 12/2000 | Sater et al. | D23/201 |
| 6,279,835 B1 | * | 8/2001 | Hansen | 239/17 |

FOREIGN PATENT DOCUMENTS

| | | | | |
|---|---|---|---|---|
| DE | 003839461 A1 | * | 4/1989 | A01G/5/06 |
| GB | 2239155 A | * | 6/1991 | A01G/9/02 |
| JP | 405276835 A | * | 11/1993 | A01G/9/00 |
| JP | 406038644 A | * | 2/1994 | A01G/31/00 |

* cited by examiner

Primary Examiner—Peter M. Poon
Assistant Examiner—Andrea M. Valenti
(74) Attorney, Agent, or Firm—Handal & Morofsky

(57) ABSTRACT

A decorative fountain comprising a support member that can be disposed on a floor or a wall is disclosed. The decorative fountain is comprised of a decorative element which may be disposed on the support member and at least one reservoir. A liquid can flow from an upper position on the decorative element, down the front of the decorative element, where it is received by the reservoir. Optionally, a liquid pumping device coupled to the reservoir may pump the liquid to the upper position on the decorative element. The decorative fountain further comprises flowers in a growing medium, with a sunlight substitute.

29 Claims, 14 Drawing Sheets

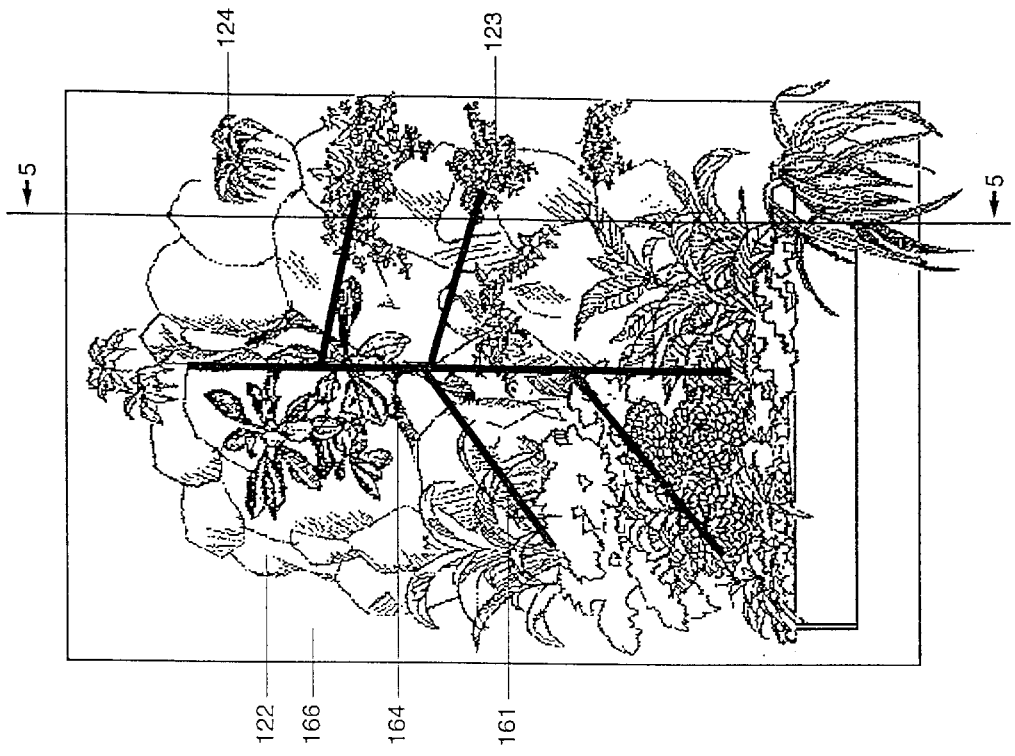
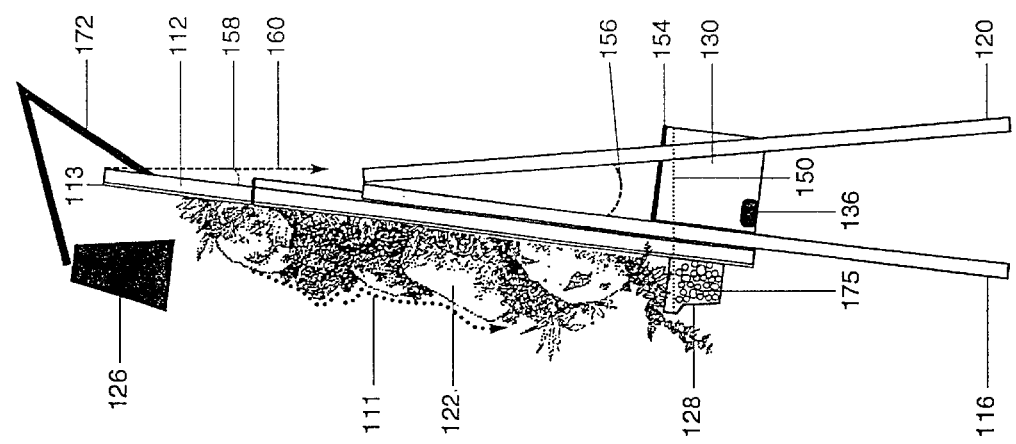

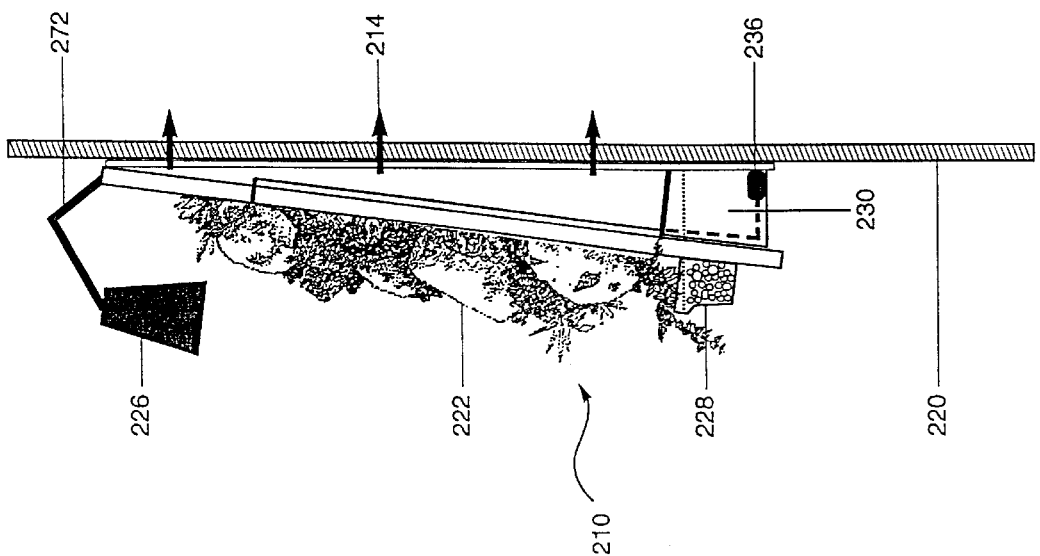
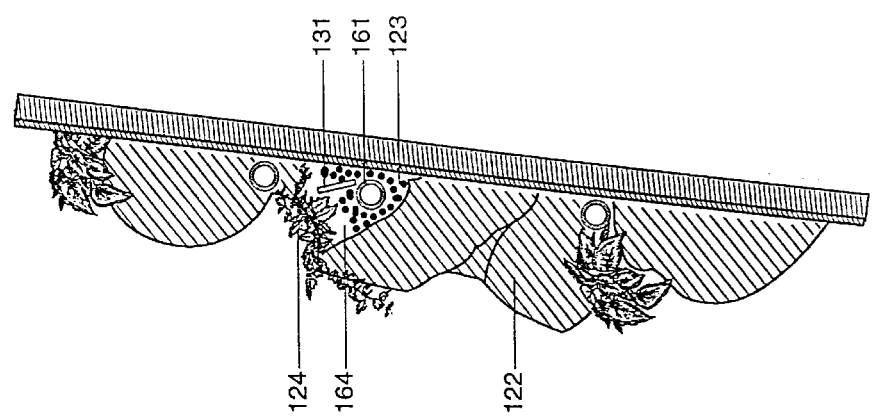

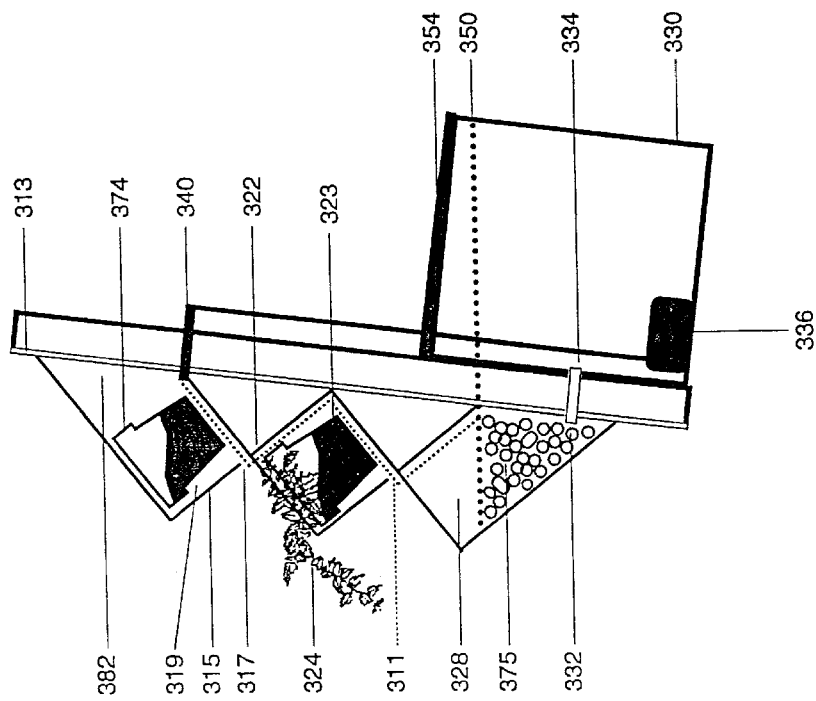
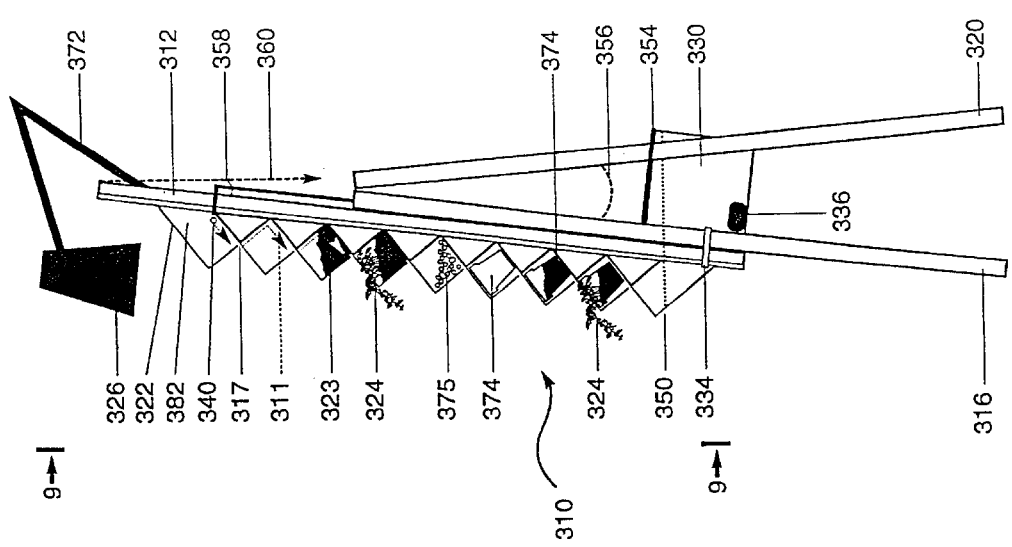

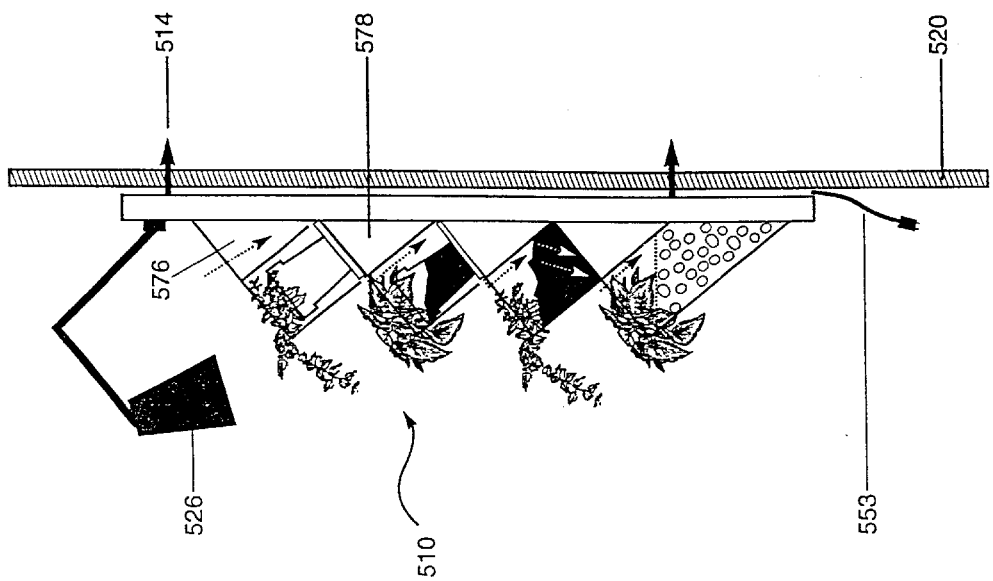
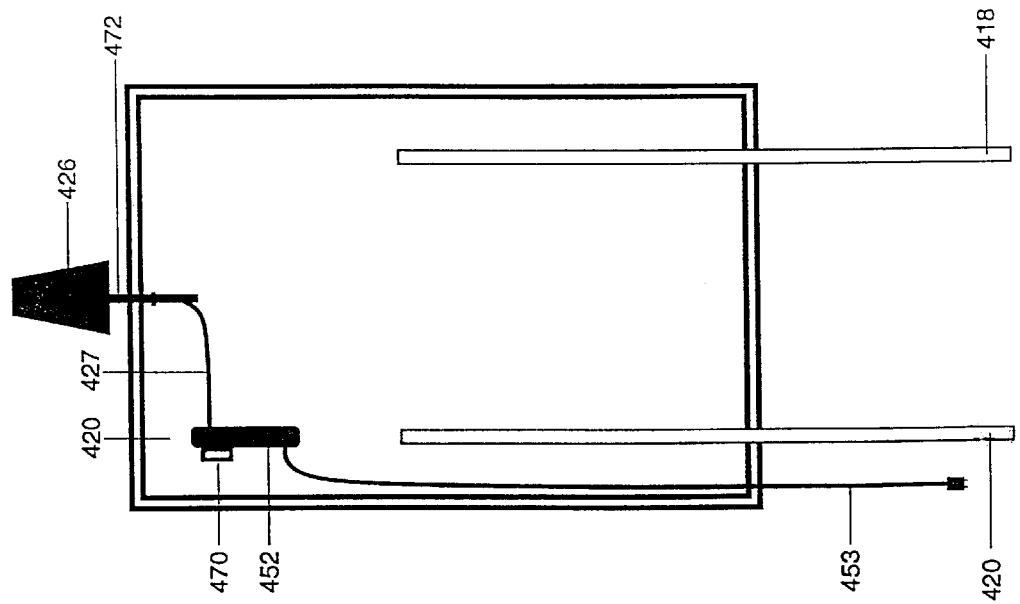

SELF-SUSTAINING INDOOR WATERFALL PLANTER

TECHNICAL FIELD

The present invention is directed, in general, to furnishings for the home or office that are both decorative and functional. In particular, the invention is directed to a vertically-oriented self-sustaining indoor waterfall planter, which serves as a decorative item of great beauty and a humidifier, while also providing the various health benefits associated with keeping plants.

REFERENCE TO GOVERNMENT FUNDING

Not Applicable.

BACKGROUND OF THE INVENTION

The use of moving water as a decorative element in the home or in public buildings is well known. Fountains have, of course, been architectural ornamentation in public places since time immemorial. More recently, artificial, self-contained decorative items using flowing water as an important decorative element have also become known. See, for example, Quillin U.S. Pat. No. 5,326,032 which discloses a waterfall device having bowls in which the system reaches a steady state of draining and refilling in each bowl with minimal splashing, and Dunn, et al. U.S. Pat. No. 4,747,538 which discloses a device having inclined panels for providing various changes to water flow thereon.

Similarly, there have been many devices developed over the years to house plants in an upright position for the indoor growing and display of house plants. Some of these devices are purely decorative in that they are simply display stands and configurations that provide support for one or more plants. Their primary design criteria is ornamental to match the style and decor of the home or office in which they are placed.

Other indoor plant stands attempt to combine ornamentality with functionality. For example, plant stands have been configured with light sources to improve the health and lifespan of indoor plants. Other apparatus have been developed that include irrigation systems, including timers, to maintain the plants watered on a regular basis.

None of the devices have been specifically designed and configured to combine the ornamental qualities of a water fall and planter as a furnishing for indoor display in a desirable self-contained apparatus.

A need therefore exists in the art for a furnishing in which the attractive qualities of flowing water and botany are employed in a very decorative manner, which provides a degree of humidity to the air of a home within which this device is located, while having the necessary functional elements to maintain the plants properly so as to sustain and further improve their health and well-being in a controlled indoor environment.

SUMMARY OF THE INVENTION

This invention relates to a planter that includes both watering and lighting control, while at the same time presenting flowing water and plants in an attractive and stylishly compatible display. Furthermore, the present invention provides a simple, dependable and practically automatic system for meeting the physiological and cultural requirements of most plant species in a self-sustaining environment.

The present invention comprises a display portion, water reservoir, pumping system and a lighting system. Preferably, the display portion further comprises an arrangement of decorative elements that recreate a natural setting, such as rocks, soil, faux animals or insects, etc, which also allows for various orientations and configurations of the plants displayed thereon, thus not limiting the user to a predetermined arrangement.

Preferably, the decorative aspects are mounted on the display portion in an essentially normal fashion with respect to the ground surface, so that the display portion may be orientated substantially vertically, much like a picture in a picture frame. The display portion may be observed at eye-level via a support structure or member, such as a hook, easel or stand. Preferably, the display portion is supported in such a manner as to create an upward slope from the bottom to the top, so that the top of the display is further away from a line normal to the ground surface than the bottom of the display.

It is also preferred that the watering system is hidden from view, and the water, upon being pumped to a vertical height within the display, is allowed to descend through the arrangement via gravity in a manner as to resemble a plurality of natural streams. The present invention also serves to humidify the surrounding air and thus, water must be added to the system periodically.

Most plants prefer to be in an acid environment but rocks, and growth of flora and fauna may release chemicals that effect the alkalinity, among other things, of the water in the system. Preferably, the present invention comprises a means for monitoring factors such as alkalinity, pH, and temperature, or any others that may affect plant-life.

Other objects, features and advantages of the present invention will become apparent from a consideration of the following detailed description.

BRIEF DESCRIPTION OF THE DRAWINGS

The advantages, and the system and apparatus of the present invention will be understood from the following description taken together with the drawings, in which:

FIG. 4 illustrates an embodiment of the display portion of the present invention; and, FIG. 5 is a cross-sectional view of the display portion illustrated in FIG. 4 and viewed along line 5—5.

FIG. 6 is a side view of an embodiment disposed on a wall.

FIG. 7 is a schematic side view of an alternative embodiment containing shelves to guide the flow of liquid.

FIG. 8 is an enlarged schematic view of a portion of FIG. 7 with gravel in the lower shelf.

FIG. 11 is a rear view of the alternative embodiment in FIG. 10 viewed along line 11—11.

FIG. 12 is a schematic side view of a variation of the alternative embodiment in FIG. 10 disposed on a wall.

DETAILED DESCRIPTION OF THE INVENTION

Figure 1:
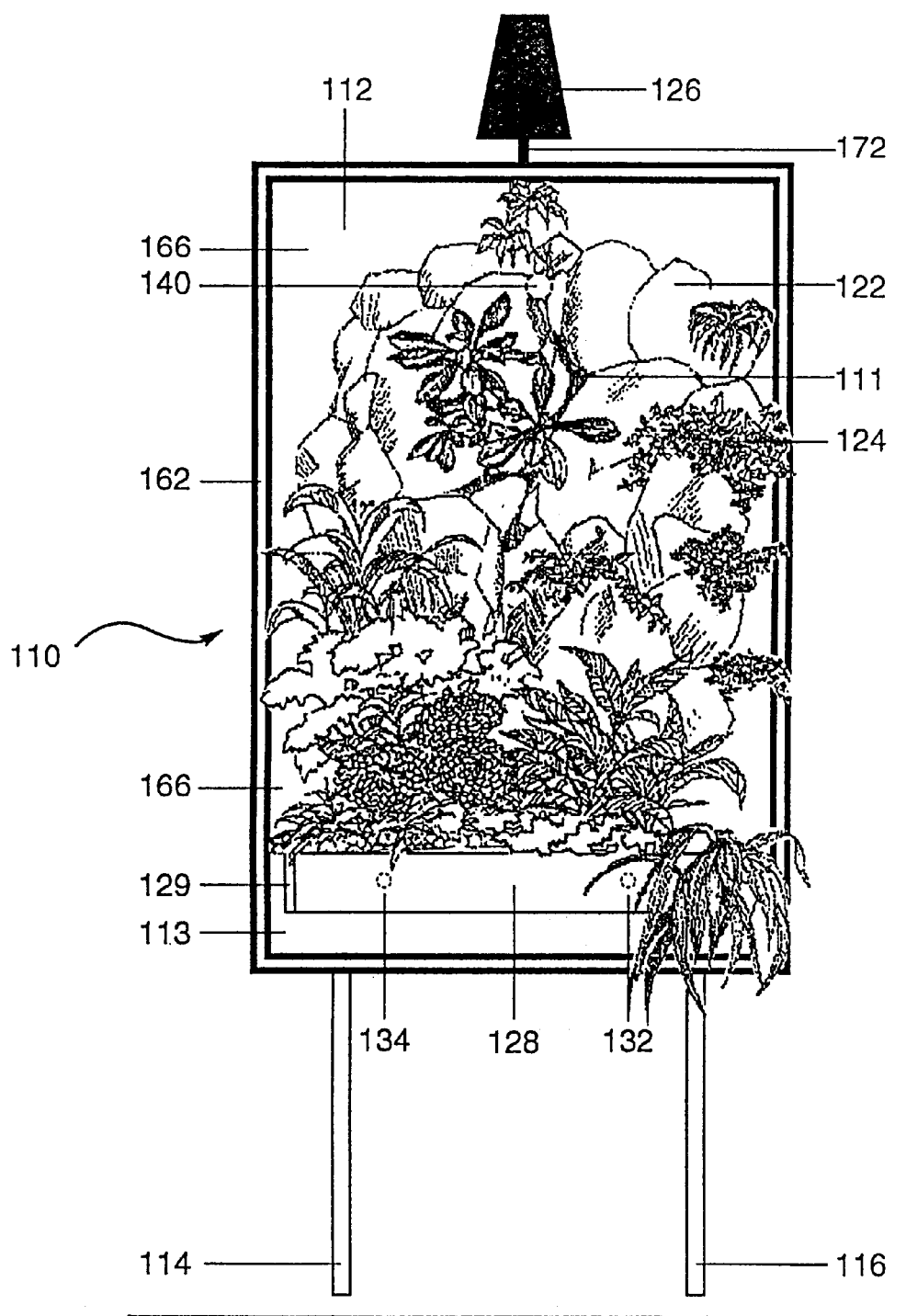
FIG. 1 is a front view of an embodiment of the present invention.

FIG. 1 illustrates a front view of the inventive self-cultivating living decorative arrangement 110. Decorative arrangement 110 includes a water entry port 140 defined in a support base 112. In accordance with the preferred embodiment of the invention, support base 112 may be a planar member having any desired dimension. For example, inventive decorative arrangement 110 may be relatively small in the range of 12 inches high and eight inches wide. Alternatively, the size of the device may be quite large, for example four feet wide and seven feet high. Typically, however, it is anticipated that maximum versatility and reasonable aesthetic impact will be achieved by having a support base in the range of 24 inches wide and 36 inches in height.

Support base 112 may be made of any suitable material, such as marine plywood, waterproof particleboard, or the like. In accordance with the preferred embodiment, support base 112 is made out of a waterproof planar member having a coating of opaque white plastic 113 on its face (FIG. 3). Waterproof materials are preferred in the construction of the inventive decorative arrangement, because, during operation, water is caused to flow from water entry port 140 at the top of decorative arrangement 110 to the bottom of decorative arrangement 110.

Figure 2:
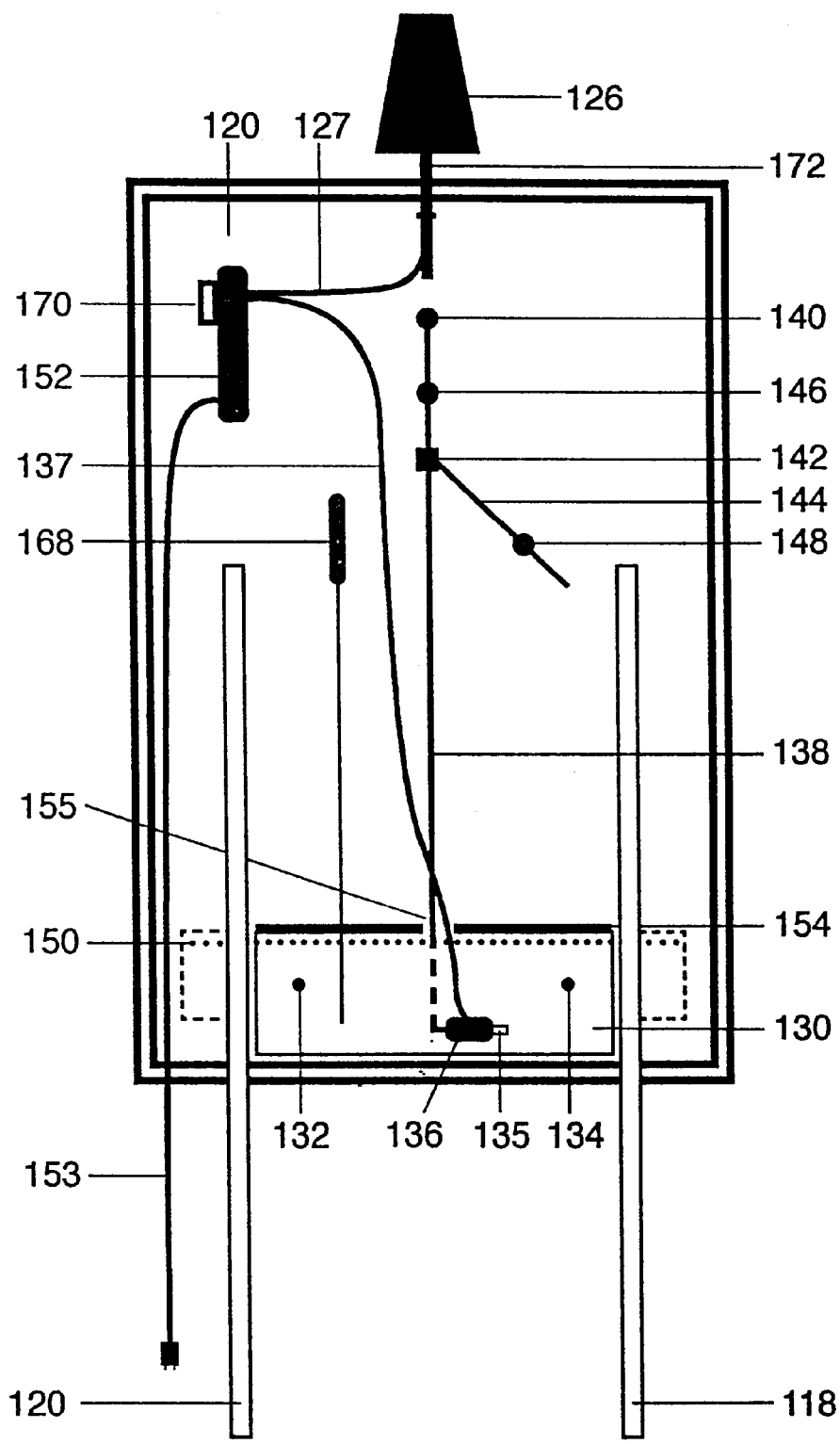
FIG. 2 is a rear view of an embodiment of the present invention.

Support base 112 is maintained in an upright position by right front legs 114 and left front legs 116. Right front legs 114 and left front legs 116 cooperate with right rear legs 118 and left rear legs 120 (FIG. 2). A simulated or real rock formation 122 is attached to support base 112, using a waterproof glue or any other suitable means. Rock formation 122 is of such a character, on account of its configuration and materials, as to promote the transfer a liquid 111 such as water and/or moisture to various parts of the formation through the use of gravity driven water flow, capillary action and/or combinations of the same as is described more fully below. In the case of water flow, the configuration of rock formation 122 includes water guiding surfaces, such as grooves, leaders, crevices, gutters, flats, spillways, inverted rails and the like configured to promote the flow of water from port 140 at the top of support base 112 both to the bottom of support base 112 and laterally to the right and left sides of support base 112.

In accordance with the invention the quantity of growing medium 123 (FIG. 5) is supported in or on grooves, flats or concave surfaces defined in rock formation 122. Any suitable growing medium, such as soil, peat moss or the like may be employed in accordance with the present invention, provided that the same is suitable for growing the particular types of plants which one wishes to incorporate in the inventive decorative arrangement 110. Suitability includes mechanical stability, proper pH, and proper nutrient content.

A variety of plants 124 are positioned in the growing medium, and are thus made to appear to be growing in rock formation 122. Suitable plants are flowers, grasses, mosses and decorative foliage plants. In order that plants 124 in decorative arrangement 110 will live and prosper, and thus provide an attractive appearance in indoor locations which may not have sufficient sunlight, a light source 126 is provided to furnish the necessary illumination for healthy plant growth. In accordance with the prefer embodiment, light source 126 comprises a swing arm type lamp, such as that marketed by Dana Lighting under model number 2010, other suitable light sources include a gooseneck lamp, ceiling lamp, or other such incandescent, halogen or flourescent light source.

A trough 128 is provided to collect water that flows down through rock formation 122, as will be described more fully below. In accordance with the preferred embodiment, trough 128 may comprise simply a short length of rain gutter, terminated on both ends by gutter end caps 129.

FIG. 2 is a rear view of inventive decorative arrangement 110. A tank 130 is provided to act, in conjunction with trough 128 (which is positioned to contain water at the same level as tank 130), as a reservoir for the water which nourishes the system. In accordance with the preferred embodiment of the system, the water in the system may be fortified periodically with fertilizer in order to promote, as desired, root, foliage and/or blossom growth. Alternatively, the system may be provided with a time release cartridge 131 (FIG. 5) to release nutrients over time.

Tank 130 is supplied and replenished with water from trough 128 by way of two pipes 132 and 134. Pipes 132 and 134 should be about one inch or larger in diameter, although any hole in excess of 0.25 inches will provide adequate results. Pipes 132 and 134 go through two holes in the rear of trough 128 which continue through support base 112 and through the adjacent wall of tank 130. Pipes 132 and 134 should be closely fitted to the holes, and are advantageously caulked, for example, with a silicone caulking compound. Such caulking is done with the objective of preserving the support base 112 and discouraging mildew and other growths, although this is not necessary.

With larger decorative arrangements 110, more than two holes and/or larger holes and pipes may be utilized. Pipes 132 and 134 extend through holes, from trough 128 through support base 112 into tank 130.

Tank 130 contains a motor driven pump 136, which has a capacity to pump 90 gallons per hour. Pump 136 pumps water through a hose 138 to port 140, whose outlet functions as port 140. Port 140 penetrates support base 112 and delivers water to rock formation 122 on the anterior of the inventive design.

A tee-connector 142 positioned in line in the middle of hose 138 and couples a drain hose 144 to hose 138. The rate of flow of water through hose 138 to rock formation 122 is adjusted by a valve 146, which may be of any conventional type. The preferred rate of flow is approximately 10 gallons per hour, however, valve 146 can be adjusted to provide a rate of flow desired by the user. Preferably, however, valve 146 is of a type which cannot be completely closed, as insuring that pump 136 will not be overloaded and damaged. Drain valve 148 is used to close the end of drain hose 144 when the system is operating.

When drain valve 148 is closed, and valve 146 is opened, all the water flows through hose 138 to rock formation 122, at a pressure and speed as determined by amount valve 146 is open. When valve 146 is fully closed and drain valve 148 is open, all the water flows out through drain hose 144, draining tank 130 and trough 128, leaving a minimum of water behind. In the preferred embodiment, hose 138 has a length of 24.5 inches from elbow 140 to top of tank 154, with 12 inches being from elbow 140 to tee connector 142, and 12.5 inches being from tee connector 142 to top of tank 154. Drain hose 144 has a length of 19 inches from tee connector 142 to its termination.

Referring to FIG. 2, the system also includes a power strip 152 into which pump 136 by way of pump power cord 137 and light 126 by way of light power cord 127 can be plugged to provide them with standard 115 volt AC house current. Power strip 152 can be located anywhere on the decorative arrangement, but the ideal position is above the level of the water to allow the power cords 137 and 127 to have downward loops which prevent water from flowing into power strip 152 which may pose a danger of a shock. Power strip 152 sits 8 inches medially from the right lateral side (7.25 inches from the right lateral edge of support base 112) and 9.5 inches inferior to the superior aspect of decorative frame 162 (8.75 inches from the superior aspect of support base 112). The power strip 152 has a width of 2 inches and a height of 12 inches and projects 1 inches from the posterior wall of support base 112. The cord 153 of power strip 152 plugs into any standard household outlet.

As can be seen in FIG. 3, water level 150, when the tank is full, should be just below both the top of trough 128 and the top of tank 130. This allows the system to be maximally filled by putting water into either front trough 128 or rear tank 130 while minimizing the risk of overflow in the other. A tank cover 154 is provided to prevent any debris from falling into the tank. A hole 155 in tank top 154 (FIG. 2) provides a passage to allow tube 138 and the power cord 137 from pump 136 to exit tank 130.

In a particularly preferred embodiment of the invention, a pH monitoring device 168 may be added to the posterior of the support base, with a probe sitting in tank 130. Most plants prefer to be in an acid environment. Rocks, and growth of flora and fauna can release chemicals that can make the water alkaline. In addition, some molds prefer an alkaline environment, so monitoring of the pH is important. Alternatively, pH can be monitored using any of the methods available for a swimming pool or fish tank. If the pH rises, it is easily remedied with the addition of a mild acid, a solution of 2 tablespoons of distilled vinegar to a half a cup of water is recommended to be added when water becomes alkaline. If mold growth is noticed, the same mild acid solution can be sprayed onto decorative arrangement 110 using an ordinary spray bottle.

The leg angle 156 (FIG. 3) formed between front legs 114 and 116 and back legs 118 and 120 is about 20 degrees in accordance with the preferred embodiment. Angles between 17 and 23 degrees give best results for relatively deep and intricate formations of rock formation 122. Acceptable results in stability and water flow can be obtained with variations in leg angle 156 in the range between 10 and 90 degrees, and/or by varying the leg length of the front 114 and 116 or rear legs 118 and 120 to alter the disposition of support base 112. Acceptable results in stability and water flow can be obtained by resting the support base 112 on the floor and dimensioning rear legs 118 and 120 to provide a proper rear support.

The legs are dimensioned to cause support base angle 158 of support base 112 with illustrative plumbline 160 to be about 14 degrees. The support base angle is of importance since much variance from the preferred measurement results in improper water flow on rock formation 122, which can lead to splashing, water flowing off the surfaces of decorative arrangement 110, or the like. Angles between 9 and 20 degrees give best results for relatively deep and intricate shapes in rock formation 122. Acceptable results in stability and water flow can be obtained with variations in support base angle 158 in the range between 10 and 55 degrees. In addition to the above, it is noted that improvements in performance of the system can be obtained by providing return paths for the flow of water back to the main flow between the top port 140 and the trough 128.

Rock formation 122 can be made of porous volcanic lava rock, or alternatively any porous rock, and/or a porous, nontoxic concrete-based resin material, or a pre-molded porous, recycled plastic. Porosity is employed to promote capillary action, in addition to gravity flow of water. Alternatively a non-porous blow-molded plastic member may be used to provide a system that relies only on gravity flow of water. Capillary action channel rods 161 (FIG. 4) of porous material may be provided to augment gravity flow in the alternative case of a blow-molded plastic rock formation 122. This will yield excellent results without the necessity for structures which guide water back to the main flow. Channel rods 161 may be formed by depositing a porous material in an aesthetically pleasing form on the molded formation. They may extend in the horizontal and vertical directions and at angles. If desired they may be hidden or placed on the sides of the inventive apparatus.

The unseen posterior side of the "rocks" in rock formation 122 may be flattened for maximum contact with support base 112. Rock formation 122 is adhered to support base 112 using hot glue or alternatively other adhesives such as cement, caulking and/or silicone. The spaces between the rocks are filled in with small amounts of cement or other filler to assist in the flow of water.

The rocks in rock formation 122 are arranged in such a way to emulate vertical ledges found in nature and provide a path for the water to flow through guided channels of high and low profile rocks. This should allow the water to flow from elbow 140 over rock formation 122 into trough 128. Out of the direct stream of water flow are multiple planter areas 164 as demonstrated in FIGS. 4 and 5.

As shown in FIG. 5, planter areas 164 are comprised of soil 123 which sits within rock formation 122 and is kept moist by the capillary action of the water through rock formation 122. This soil allows plants 124, such as flowers, to grow and develop root structures. It is important that these areas are away from the direct flow of water, since water pooling in these areas would result in the flower's roots rotting and dying. Crevices in the rock formation 122 allows water to flow away from the roots by gravity thus prevent the water from pooling near the roots as well. In particular, it is also noted that plants' roots need oxygenated water, which is one of the objectives in hydroponic systems, where plants grow in aerated water.

Support base 112 is made of a flat, hydrophobic material, such as plastic which is impervious to water. Support base 112 is designed so that there is an empty space 166 (FIG. 4) around rock formation 122 to stop the capillary action of the water through the rocks.

Surrounding support base 112 is decorative frame 162 (FIG. 1), which can be made to match any decor. Support base 112, as illustrated FIG. 1, is 24 inches wide by 36 inches high, and decorative frame 162 is 1 inch wide and extends around the four sides of support base 112. As can be seen in FIG. 2, support base 112 is 24.75 inches wide by 37 inches in height, and decorative frame 162 is 0.75 inches wide. Decorative frame 162 projects anteriorly 0.6 inches from the plane created by the anterior aspect of support base 112, with the frame having a depth of 1 inches. The bottom of support base 112 sits 15 inches off the ground. Support base 112 is of a white background and rectangular in shape. However, alternatively support base 112 can be of any shape or color to match a given decor.

The front and rear legs 114, 116, 118, and 120 are made of 1 inch by 1 inch wood, in accordance with the preferred embodiment. However, alternatively, other sizes, and shapes for the legs and their cross-sections may be employed. Likewise, other materials can be used as well, such as metals like aluminum or steel, and man-made materials such as plastic. Front legs 114 and 116 are 39.5 inches in length, and are separated by 14.25 inches at their superior aspect and 14.5 inches at their inferior aspect. Rear legs, 118 and 120 are 38 inches in length, and are separated by 14.25 inches at their superior aspect and 14.75 inches at their inferior aspect. Front legs 114 and 116 attach to support base 112 at a distance 4.25 inches medial from the edge of frame 162 (3.75 inches from the edge of support base 112) and 13.25 inches from the top of decorative frame 162 (or 12.5 inches from the top of support base 112). The front and the rear legs are separated by 13.5 inches at their inferior aspect, and hinged together at their superior aspect. Alternatively other leg heights and angles can be utilized, as described above.

Alternatively, decorative arrangement 210 can be hung on a wall 220 without legs using appropriate hardware such as toggle bolt 214 and methods for a device of such weight, as illustrated in FIG. 6.

Trough 128, should be slightly wider then rock formation 122 to collect all the water dripping and flowing down from rock formation 122. Trough 128 contains small stones 175, marbles and/or the like, which can serve as a planter area for flowers 124. The plants in trough 128 root hydroponically in the aerated water that is constantly circulating through trough 128. The plants can be arranged to hang over the front of trough 128 to help to partially hide the trough. Trough 128 is 22 inches wide and projects 3 inches from support base 112 at its inferior aspect and 4.5 inches at its superior aspect, and is 3.5 inches in height. From the superior aspect, the front drops perpendicular to the superior aspect 1.25 inches, the remaining 3.25 inches have a concave shape and terminate in a right angle with the inferior aspect. In the alternative, the trough can be made larger in front. Trough 128 can also conceivedly contain the pump. This can be done, for example, when there is limited rear space such as when decorative arrangement 110 hangs on a wall 220. Trough 128 can also have a semicircular shape, protruding further from support base 112. Varying shapes and sizes or trough 128 can be utilized to adapt the invention to any decor.

In the preferred embodiment, light source 126 is an incandescent light fixture with a low wattage, high intensity flourescent bulb which emits light rays of a suitable spectrum for plants, thus eliminating the need for natural light. The bulb is designed to remain cool while in use. The light source is on a moveable arm made of two 10 inch hinged pieces 172 to allow for adjusting of the direction of the light rays to compensate for shadows caused by the rock formation itself or from plant growth. Depending upon the plants that are going to be grown, it is contemplated that two or more such light sources may be provided for foliage that requires bright light, or for larger decorative arrangement 110. Light source 126 is not on continuously. Rather, light source 126 is turned on and off by a timer 170 (FIG. 2). Timer 170 is of conventional design and plugs into power strip 152. The timer is set to keep the light on for 18 hours a day, which is most desirable for plants with a high light requirement, or the "on" time can be adjusted to the optimum value for the type of plants 124 being grown.

In the preferred embodiment, trough 128 and tank 130 are designed to hold two gallons of water when filled. Under average humidity and air circulation conditions, decorative arrangement 110 has an evaporation rate of approximately one gallon per week. Thus, water only has to be added to the system about once every other week. Tank 130 is larger and deeper than trough 128 and is designed to hang lower then trough 128. Tank 130 is hidden behind support base 112. This design allows for tank 130 to hold the majority of the water.

Tank 130 is 14 inches wide by 9 inches high and projects out 8.25 inches from the posterior aspect of support base 122 at a perpendicular angle to support base 112. The top of tank 154 is 14.25 inches wide by 0.25 inches high, and projects out 8.5 inches from the posterior aspect of support base 112 at a perpendicular angle to support base 112. The top of the tank is level with the inferior aspect of the decorative frame 162 to hide tank 130. Trough 128 is positioned 1.5 inches above the bottom of decorative frame 162. This allows water in trough 128 to drain efficiently into tank 130. The tank can be made larger to accommodate more water, or smaller when limited rear space is available. Other shapes for tank 130 can also be used. The tank can also be designed to act as the rear frame for decorative arrangement 110. It is also conceived that when the tank acts as the rear frame, it can act as a base as well so the decorative arrangement can be disposed on a floor.

Since evaporation of water can lead to a build-up of mineral deposits and crystallization of the minerals making them unavailable to the flora, a water change is recommended once a month. This is accomplished by closing valve 146 and opening drain valve 148, thus allowing water to flow out of drain hose 144, when the pump is activated. When tank 130 is empty, drain valve 148 is closed, two gallons, or the capacity for tank 130 and trough 128, of fresh tap water is added to the system either into trough 128 or tank 130, and valve 146 is opened and adjusted to provide proper water flow to rock formation 122.

Figure 3A:
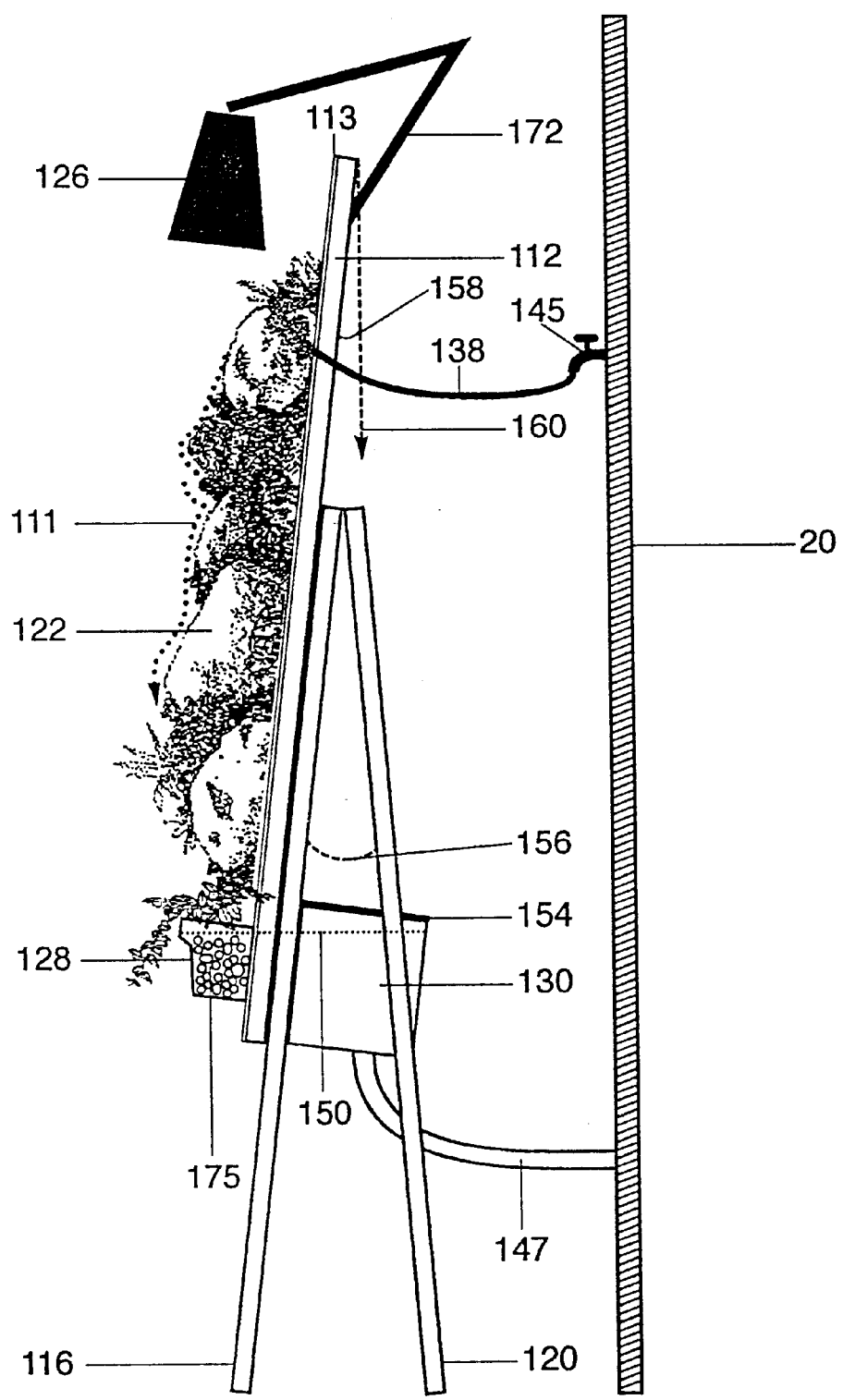
FIG. 3 is a side view of an embodiment of the present invention further illustrating the optional attachment to a water supply and drain.

It is also conceivable to attach decorative arrangement 110 to a water supply 145 and a drain 147 leading into plumbing within a wall 20, or floor, with or without a recirculation pump as is illustrated in FIG. 3a. In this case, the size of tank 130 will be minimized.

Another alternative is for decorative arrangement 110 and tank 130 to be attached to a water supply with a water level sensor, much like the float sensor and valve found in the tank of a toilet, that will automatically replenish evaporated water.

The sound and movement of water flowing down rock formation 122 is designed to provide a calming effect.

The invention as a whole can be used to teach children and adults about flowers and nature. For example the user can use different types of flowers, vary the light, vary the pH of the water flow, see the effects of water flowing through rock by capillary action. It is an ideal invention for starting most plants from cuttings.

The aesthetic function of the invention as a whole as a living "landscape painting".

The invention is light enough to keep it portable. Water is easily drained and added, as described above, which assists in the ease of portability.

The inventive decorative arrangement 110 can be sold whole, customized to a buyers request or as a kit that the end user can assemble in accordance with a preset plan or in a variety of ways. For example, a range of kits can include all pieces preassembled, except for the legs. In this case the legs merely need to be attached. In another case, all the pieces are separate and the end user has to fully assemble it. Instructions for assembly would be included in all kits. An instruction book of care and maintenance of the inventive decorative arrangement 110 will be included will all inventive decorative arrangement 110.

In accordance with an alternative embodiment of the invention, trough 128 may be made transparent, with the dimension varied and be equipped to support living fish. More particularly, drain hose 144 can be equipped with a conventional filter used to filter water in a fish tank. In addition, aeration may be provided by running an aerator off the same motor which is running pump 136.

In accordance with yet another alternative embodiment of the invention, a decorative arrangement 210 may be wall mounted as illustrated in FIG. 6. This embodiment of the invention is identical to the embodiment of the invention illustrated in FIG. 1, except that front and rear legs have been replaced by an appropriate wall mounting bracket 214. Parts having similar or analogous functions have been numbered with numbers 100 higher than the numbers in the embodiment illustrated in FIGS. 1–5.

Figure 8A:
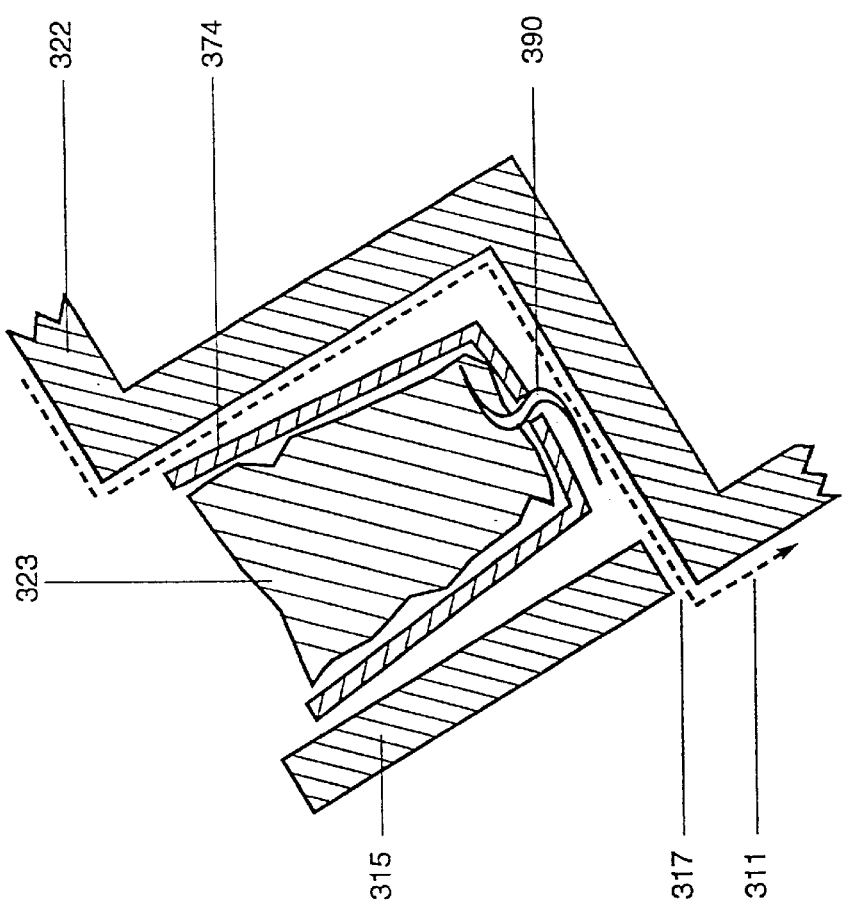
FIG. 8A is an enlarged cross section view of one shelf in FIG. 7.
Figure 9:
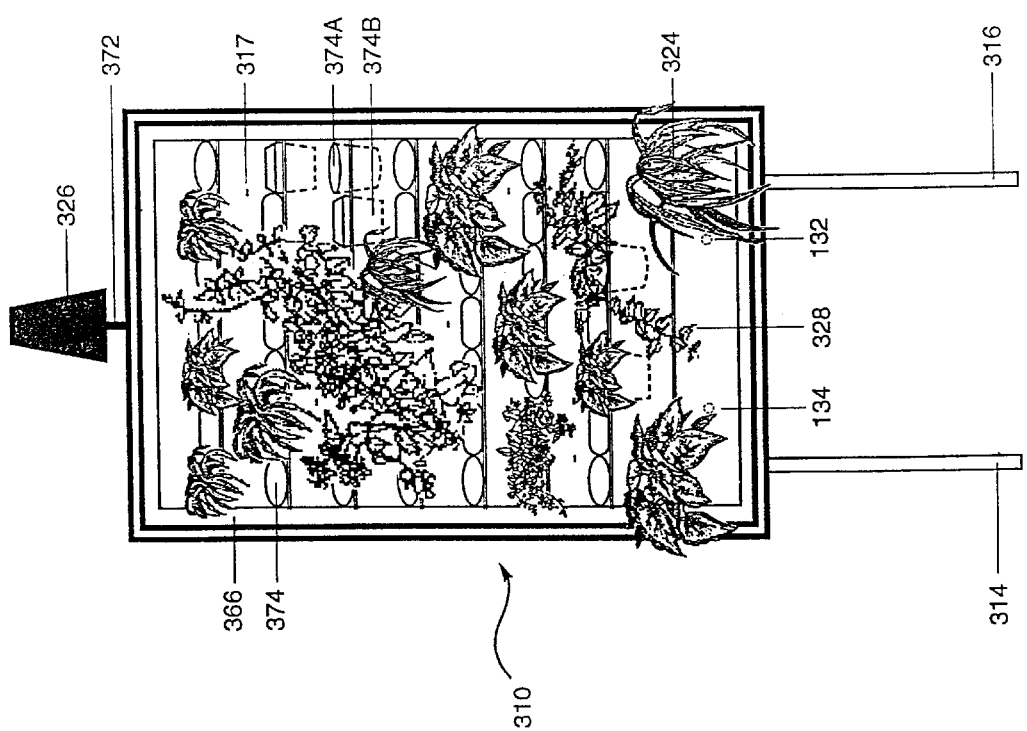
FIG. 9 is a front view of the alternative embodiment in FIG. 7 viewed along line 9—9.

In an alternative embodiment 310 illustrated in FIGS. 7–9, parts having similar or analogous functions have been numbered with numbers 200 higher than the numbers in the embodiment illustrated in FIGS. 1–5. Attached to support base 312 is a continuous sheet of hydrophobic material 322. Sheet 322 which forms a series of shelves disposed with their anterior aspect inferior as compared to their posterior aspect. It is also conceived that there can be a plurality of shelves each individually attached to support base 312. Connected to sheet 322 is a guard rail 315 disposed so there is a small space or spaces 317 between rail 315 and sheet 322 just below it. Rail 315 can be an extension of sheet 322 or made of a material adhered to sheet 322.

Space 317 is dimensioned to allow the flow of liquid 311 through space 317, while retaining any contents of a region 319 between the posterior aspect of rail 315 and sheet 322 directly behind space 317. It is also conceived that sheet 322 can provide a small upward projection of sheet 322 directly below space 317 allowing additional liquid 311 to be retained in region 319. Contained within region 319 can be growing medium 323 in which flowers 324 are disposed. Alternatively, region 319 can contain small stones 375, marbles or the like. Further, region 319 can contain commercially available flower pots 374 dimensioned to fit into region 319. In the preferred embodiment, flower pots 374 are of a three inch diameter, however, with a change in the size of decorative arrangement 310, other size pots may be utilized. FIG. 9 illustrates two such varieties of pot 374, a round pot 374a, and a square pot 374b. Pot 374 can contain a variety of substances, including growing medium 323, flowers 324, or small stones 375.

In this embodiment, liquid 311 enters upper most shelf 382 through entry port 340, flowing down sheet 322 through space 317 into region 319 below. It then flows down sheet 322 through space 317, and so on until liquid 311 reaches inferior most region 328, where it is carried through pipes 332 and 334 to a tank 330 and returned to the entry port 340 as described in previous embodiments. While liquid 311 is in region 319, it can carry nutrients to the flora and flora present, as described in previous embodiments. FIG. 8 illustrates an enlarged view of a portion of FIG. 7 with gravel 375 added to inferior most region 328. FIG. 8A illustrates an enlarged view of a portion of FIG. 7 in cross-section with a wick 390 optionally disposed from shelf 322 through a hole in the bottom of pot 374 into growing medium 323. Wick 390 can be utilized to aid in the transfer of liquid 311 into soil 323.

Figure 10:
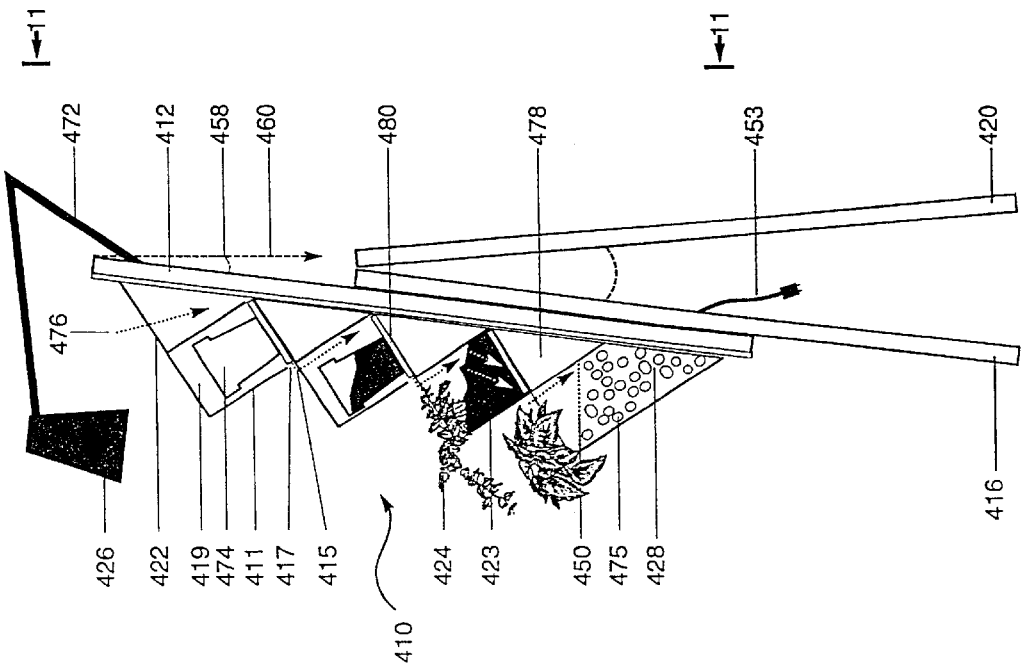
FIG. 10 is a schematic side view of an alternative embodiment comprising shelves and a water retaining member.

In an alternative embodiment, decorative arrangement 410 is illustrated in FIGS. 10–11, parts having similar or analogous functions have been numbered with numbers 100 higher than the numbers in the embodiment illustrated in FIGS. 7–9. Attached to support base 412 is a continuous sheet of hydrophobic material 422. Sheet 422 which forms a plurality of shelves disposed with their anterior aspect inferior as compared to their posterior aspect. It is also conceived that there can be a plurality of shelves each individually attached to support base 412. Both constructions leaves open spaces 478 between sheet 422 and support member 412. Connected to sheet 422 is a guard rail 415 disposed so there is a small space 417 between rail 415 and sheet 422 just below it. It is also conceived that space 417 can be made of multiple small holes. Rail 415 can be an extension of sheet 422 or made of a material adhered to rail 415. Disposed on top of the shelves is a foam-like material 480. Foam-like material 480 is of the type commonly used in greenhouses and florists to retain liquids 411. Decorative arrangement 410 can be disposed on a wall, floor, or support by means described in previous embodiments.

Space 417 is dimensioned to allow the flow of liquid 411 in excess of the capacity of the foam-like material 480, while retaining any contents of a region 419 between the posterior aspect of rail 415 and sheet 422 directly behind it. It is also conceived that sheet 422 can provide a small upward projection of sheet 422 directly below space 417 allowing additional liquid 411 to be retained in region 419. Contained within region 419 can be growing medium 423 in which flowers 424 are disposed. Alternatively, region 419 can contain small stones 475, marbles or the like. Further, region 419 can contain commercially available flower pots 474 dimensioned to fit into region 419. In the preferred embodiment, flower pots 474 are of a four inch diameter, however, with a change in the size of decorative arrangement 410, other size pots may be utilized. Pot 474 can contain a variety of substances, including growing medium 423, flowers 424, or small stones 475.

In embodiment 410, liquid 411 is added by the user to open area 476 of the upper most shelf 482. After reaching the capacity of the foam-like material 480, excess liquid 411 then flows down sheet 422 through space 417 into region 419 below. It then flows down sheet 422 saturating the foam-like material 480, the excess liquid 411 flows through space 417, and so on until liquid 411 reaches inferior most region 428 where excess liquid 411 is stored. Inferior most region 428 would be ideal for plants that like a very wet environment.

FIG. 11 illustrates a posterior view of the embodiment 410, showing the optional attachment of light source 426, power supply 452 and timer 470. Alternatively, decorative arrangement 510 can be hung on a wall 520, without legs using appropriate hardware 514 and methods for a device of such weight, as illustrated in FIG. 12.

Figure 14:
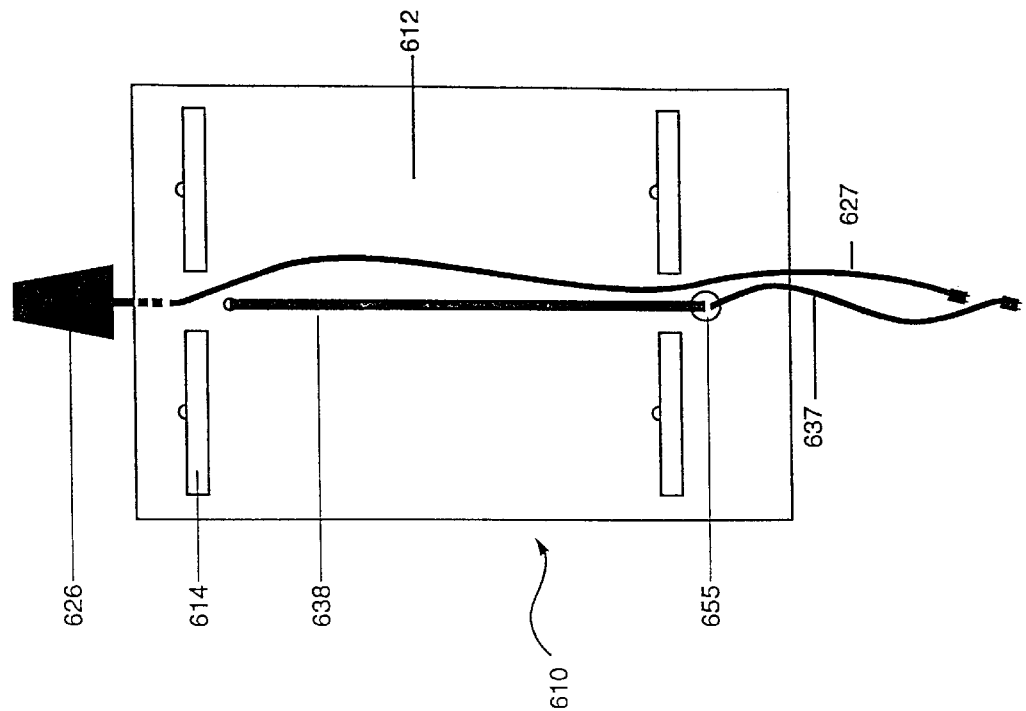
FIG. 14 is a rear view of the alternative embodiment in FIG. 13 viewed along line 14—14.
Figure 13:
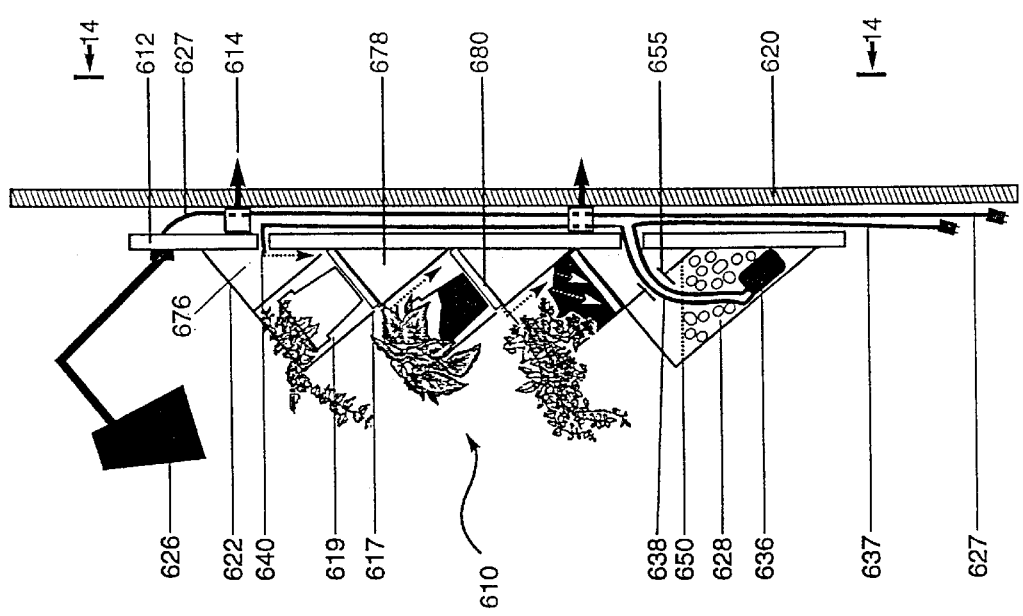
FIG. 13 is a schematic side view of an alternative embodiment comprising shelves, a pump, and a water retaining member.

FIG. 13 and 14 illustrate an embodiment 610 similar to those illustrated in FIGS. 10–12 and further comprises a pump 636. Liquid 611 enters through entry port 640, flowing down sheet 622 through space 617 into region 619 below, saturating foam-like material 680. It then flows down sheet 622 saturating the foam-like material 680, the excess liquid 611 flows through space 617, and so on until liquid 611 reaches inferior most region 628, where it is carried through pipes 632 and 634 to a tank 630 and returned to the entry port 640 by pump 636 as described in previous embodiments. In the preferred embodiment, pump 636 is disposed in the inferior most region 628, however, it is conceived that pump 636 can be disposed in other locations with varying results.

In the preferred embodiment, the opening 655 that power cord 637 and hose 638 exits the posterior of inferior most region 628 is disposed slightly higher then the top most portion of the anterior section of inferior most region 628. This prevents water from flowing backwards toward support member 612 if decorative arrangement 610 is overfilled. Additionally, opening 655 has a slight anterior projection and inferior tilt into inferior most region 628 so liquid 611 flowing down will not travel through opening 655 toward support member 612.

Although FIGS. 13 and 14 illustrate decorative arrangement 610 disposed on a wall using appropriate hardware 614, it is also conceived that embodiment 610 can be disposed on a support or floor as described in previous embodiments.

Figure 16:
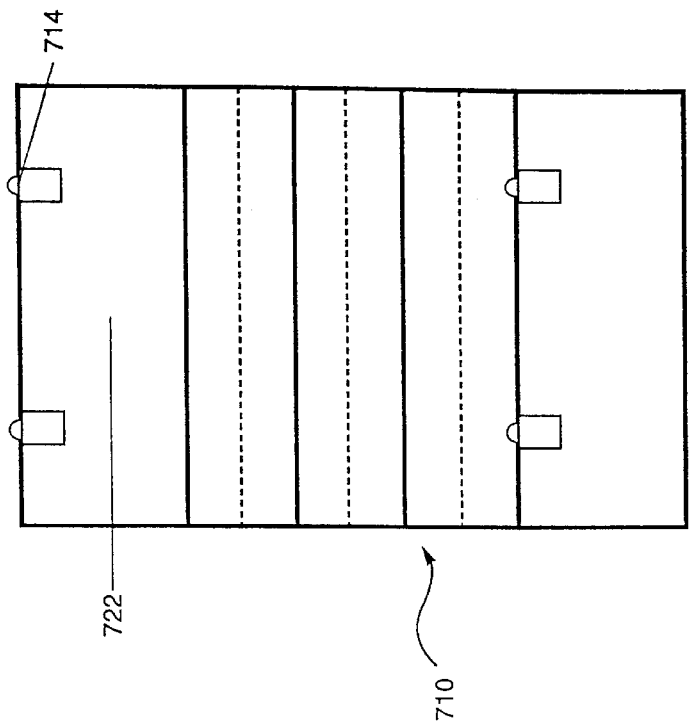
FIG. 16 is a rear view of the alternative embodiment in FIG. 15 viewed along line 16—16.
Figure 15:
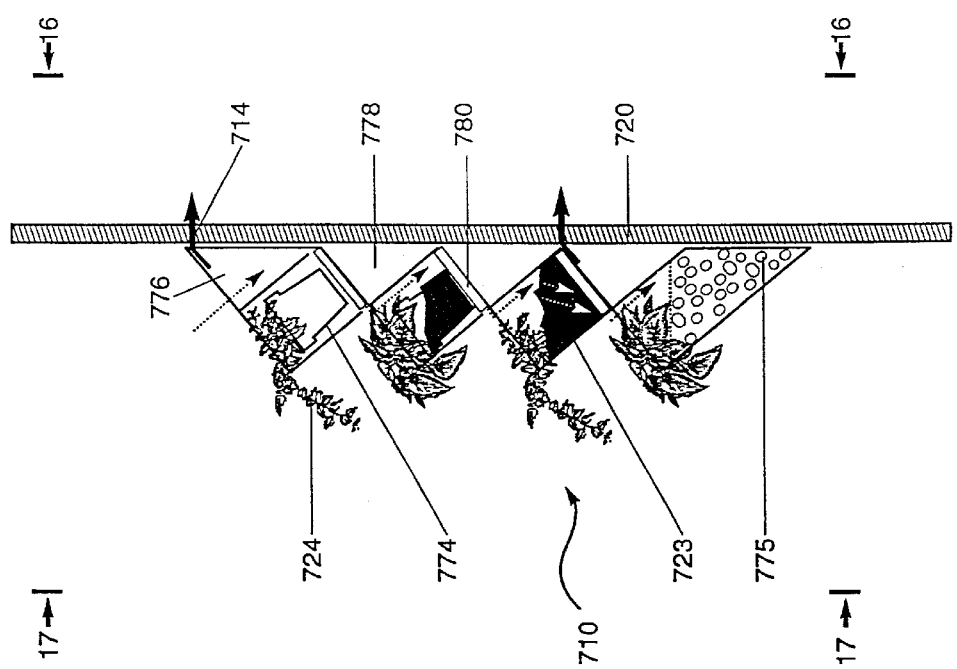
FIG. 15 is a schematic side view of an alternative embodiment comprising shelves and a water retaining member disposed directly to a wall.
Figure 17:
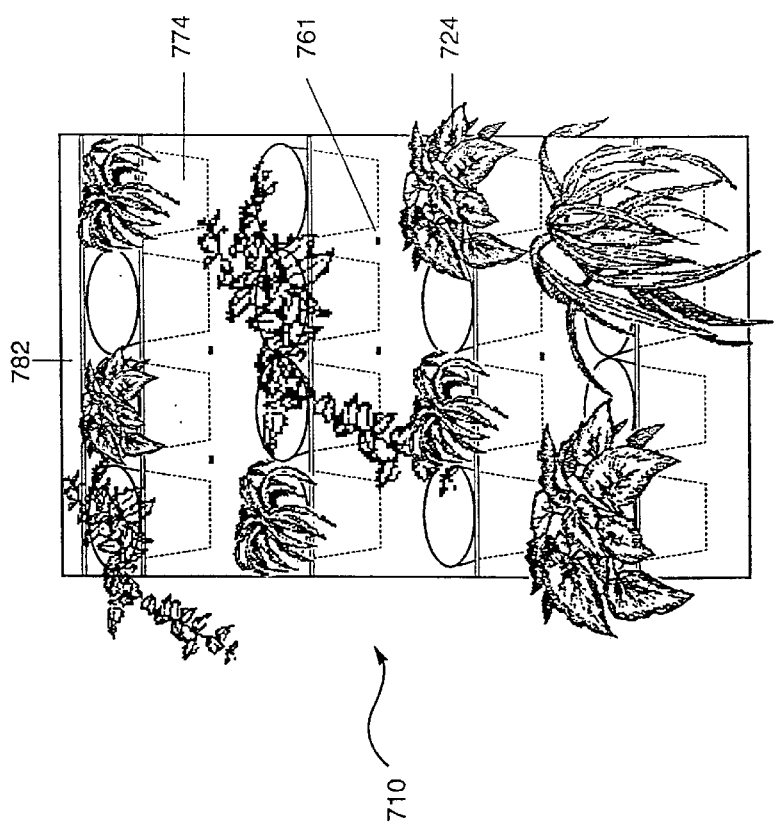
FIG. 17 is a front view of the alternative embodiment in FIG. 15 viewed along line 17—17.

FIGS. 15–17 illustrate an decorative arrangement 710 similar to those illustrated in FIGS. 10–12 except sheet 722 is directly mounted to the wall using appropriate hardware 714. A support member is not utilized in this embodiment.

Figure 18:
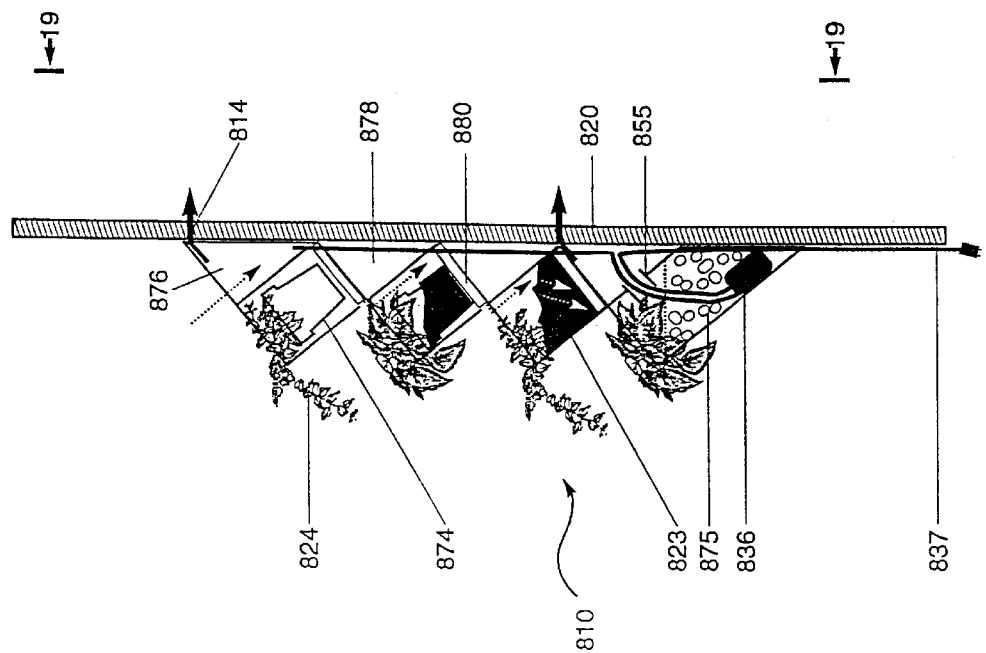
FIG. 18 is a schematic side view of an alternative embodiment comprising shelves, a pump, and a water retaining member disposed directly on a wall.
Figure 19:
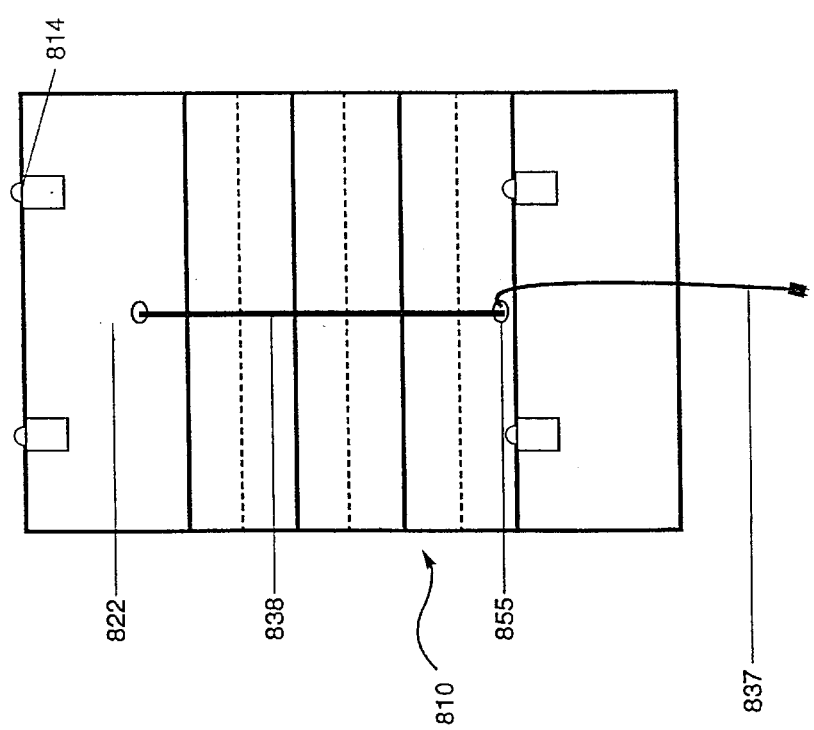
FIG. 19 is a rear view of the alternative embodiment in FIG. 18 viewed along line 19—19.

FIGS. 18–19 illustrate embodiment 810 which is similar to decorative arrangement 710, additionally comprising a pump 836. Liquid 811 enters through entry port 840, flowing down sheet 822 through space 817 into region 819 below, saturating foam-like material 880. It then flows down sheet 822 saturating the foam-like material 880, the excess liquid 811 flows through space 817, and so on until liquid 811 reaches inferior most region 828, where it is carried through pipes 832 and 834 to a tank 830 and returned to the entry port 840 by pump 836 as described in previous embodiments. In the preferred embodiment, pump 836 is illustrated in the inferior most region 828, however it is conceived that pump 836 can be disposed in other locations with varying results.

Figure 20:
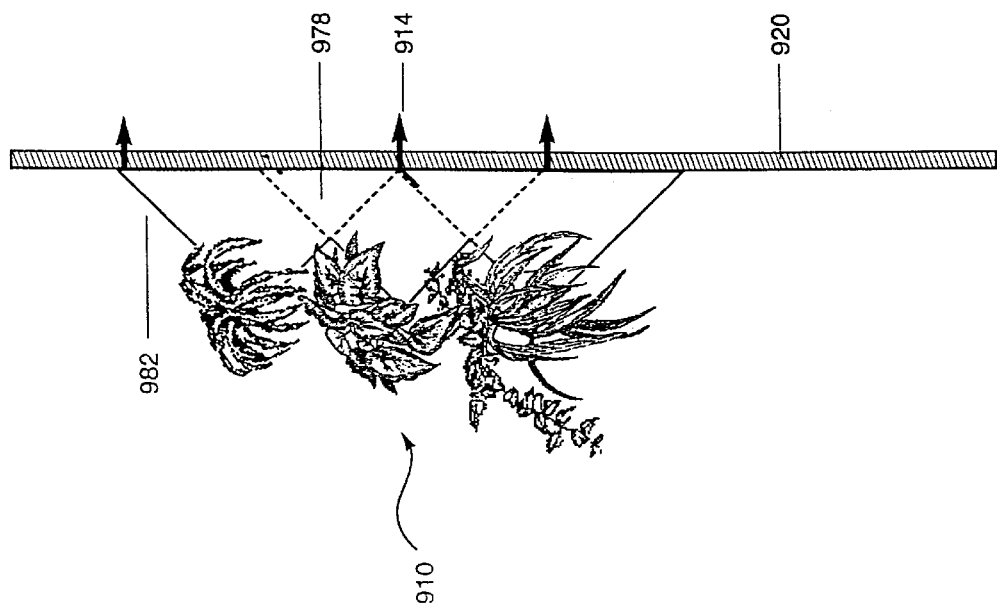
FIG. 20 is a side view of an alternative embodiment comprising shelves with the sides finished off.

FIG. 20 illustrates a side view of embodiment 910 which is similar to decorative arrangement 810. In decorative arrangement 910, space 978 is closed up by the side panels 980. Side panels 980 can be a continuation of sheet 922, or a separate member adhered to sheet 922.

Figure 22:
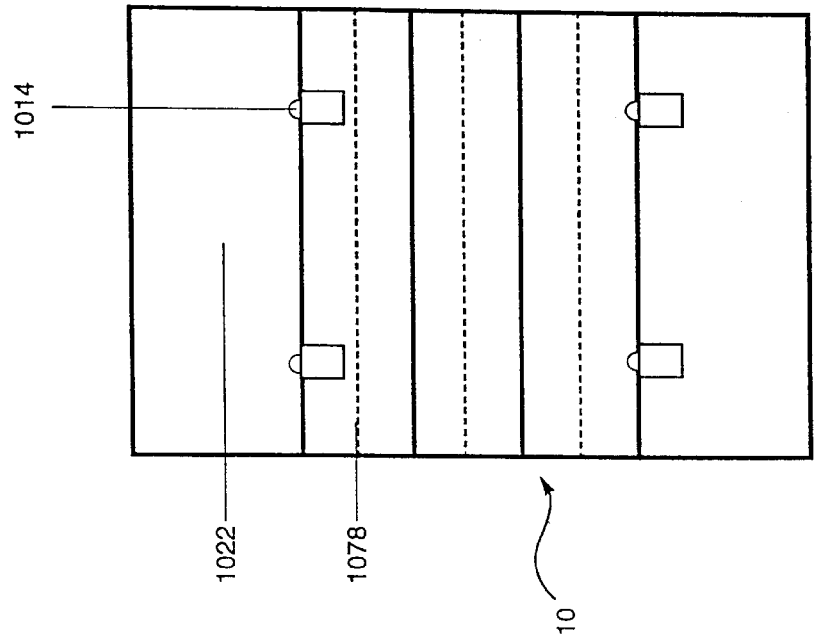
FIG. 22 is a rear view of the alternative embodiment in FIG. 21 viewed along line 22—22.
Figure 21:
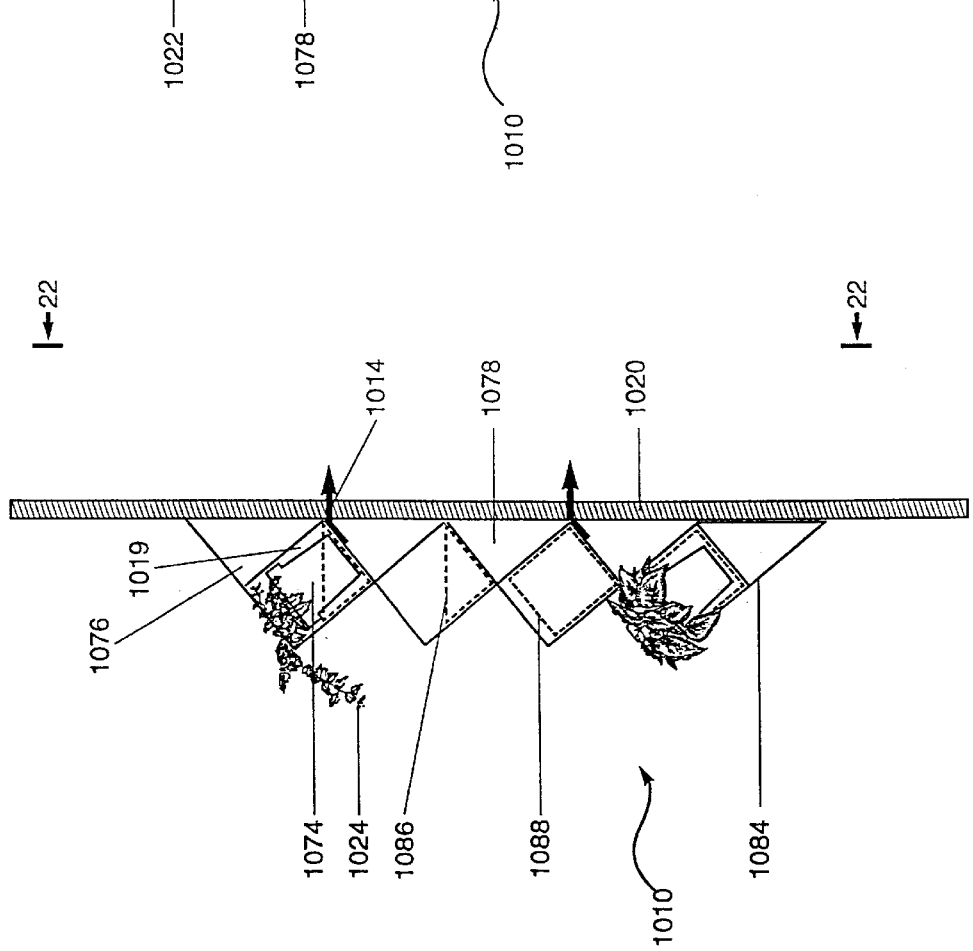
FIG. 21 is a side view of an alternative embodiment comprising shelves without drains disposed directly on a wall.

FIGS. 21–22 illustrate an decorative arrangement 1010 similar to those illustrated in FIGS. 15–17 except region 1019 is an enclosed region without a drain. In embodiment 1010 liquid 1011 must be added to each individual shelf. Region 1019 can be lined with a triangular liner 1086 that just lines the inferior most region of each shelf, or a rectangle liner 1088 that lines to all margins of region 1019. Contained within region 1019, or liners 1086 and 1088 can be growing medium 1023 in which flowers 1024 are disposed. Alternatively, region 1019 can contain small stones, marbles or the like. Further, region 1019 can contain commercially available flower pots 1074 dimensioned to fit into region 1019. Pot 1074 can contain a variety of substances, including growing medium 1023, flowers 1024, or small stones. Although FIGS. 21 and 22 illustrate decorative arrangement 1010 disposed on a wall using appropriate hardware 1014, it is also conceived that embodiment 1010 can be disposed on a support or floor as described in previous embodiments.

Facade 1076 closes off the rear region of upper most section 1082 for decorative purposes. Alternatively, it is also conceived that facade 1076 can be left off the embodiment. Lower facade 1084 gives a finished off look to lower most section 1028. Facade 1076 is configured and dimensioned to provide a continuation of the front surface of lower section 1028 into the wall 1020 behind embodiment 1010. Alternatively, it is also conceived that facade 1084 can be left off the embodiment.

While illustrative embodiments of the invention has been described, it is, of course, understood that various modifications of the invention will be obvious to those of ordinary skill in the art. Such modifications are within the spirit and scope of the invention which is limited and defined by the appended claims.

I claim:

1. A decorative fountain, comprising:
   (a) a support member, said support member comprising a display support structure having an area, and said support member being configured to be put at rest extending upwardly in a stable position;
   (b) a plurality of decorative elements disposed throughout the area of said support structure, said decorative elements receiving and supporting non-aquatic living plants in a respective recess, said decorative elements being configured to generally resemble ledge-like structures found in nature, said decorative elements extending from said support structure and defining recesses configured and dimensioned to support a growing medium for said plants, and configured to guide the surface flow of an aqueous liquid toward the top surface of said growing medium and said non-aquatic living plants, said surface flow of said liquid being fed by a falling flow of said liquid and said support structure being configured and dimensioned to guide said falling liquid from an upper position on said support structure to a lower position on said support structure, said support structure and said decorative elements configured to guide said falling flow of liquid from said upper position to said lower position, with said falling flow of liquid cascading to said decorative elements;
   (c) at least one reservoir disposed on said support member and positioned to receive liquid flowing from said lower position;
   (d) a liquid pumping device having an input and an output;
   (e) an input coupling member for coupling said reservoir to the input of said liquid pumping device; and
   (f) an output coupling member for coupling the output of said liquid pumping device to said upper position.

2. A decorative fountain as in claim 1, further comprising at least one source of light for providing a sunlight substitute to said non-aquatic living plant.

3. A decorative fountain as in claim 2 wherein said reservoir comprises compartments for collecting said flowing liquid.

4. A decorative fountain as in claim 2, wherein said reservoir comprises a front reservoir disposed on a front surface of said support structure, and a rear reservoir disposed on a rear surface of said support structure, said front reservoir and said rear reservoir separated by a wall structure, and being functionally connected by at least one channel penetrating said wall structure to allow for the flow of liquid between said front and said rear reservoirs.

5. A decorative fountain as in claim 4 further comprising a pH measuring member for monitoring the pH of said flowing liquid.

6. A decorative fountain as in claim 5 further comprising a timer device to control the time said light is on.

7. A decorative fountain as in claim 6 wherein said display support structure is oriented with a rearward tilt of 10–55 degrees.

8. A decorative fountain as in claim 7 wherein said support member is an easel.

9. A decorative fountain as in claim 8 wherein rate of flow of said falling liquid is controlled by a valve, said valve disposed on said output coupling member, and said valve applies a compressive force on said output coupling member.

10. A decorative fountain as in claim 9 further comprising a drain member to facilitate removal of said liquid from said decorative fountain comprising:
    (g) a drain coupling member attached to said output coupling member; and
    (h) a valve disposed on said drain coupling member to control the draining of said liquid from said decorative fountain, said valve being configured and dimensioned to provide a compressive force on the outer walls of said drain coupling member.

11. A decorative fountain as in claim 10, wherein said display support structure further comprises a decorative frame around said display support structure of said support member.

12. A decorative fountain as in claim 1 wherein said decorative element comprises a precast material, optionally porous rock, such as porous volcanic lava rock, a porous, nontoxic concrete-based resin material, or a pre-molded porous, recycled plastic.

13. A decorative fountain as in claim 1, wherein said decorative elements are further configured and dimensioned to guide said liquid toward said non-aquatic living plant by capillary action.

14. A decorative fountain as in claim 1, wherein said decorative element further comprises rock and a second non-aquatic living plant in a growing medium, and wherein said decorative elements are further configured and dimensioned to guide the surface flow of said liquid toward said non-aquatic living plant due to the capillary action inherent in said rock.

15. A decorative fountain as in claim 1, wherein said surface flow is caused by capillary action.

16. A decorative fountain as in claim 1, wherein said support structure is configured for mounting on a wall.

17. A decorative fountain as in claim 1, wherein said support structure further comprises a tripod secured to said display support structure.

18. A decorative fountain as in claim 1 wherein said decorative element comprises a precast material configured to resemble shelves.

19. A decorative fountain, comprising:
    (a) a support member configured to rest extending upwardly in a stable position on a floor, said support member comprising a display support structure having an area, wherein said display support structure is oriented with a rearward tilt of 10–55 degrees;
    (b) a plurality of decorative elements disposed throughout the area of said support structure, each of said decorative elements being configured and dimensioned to define a recess for containing a plant and to guide a falling aqueous liquid from an upper position on said decorative elements to a lower position on said decorative elements, said decorative elements containing a non-aquatic living plant in a growing medium, and being further configured and dimensioned to support said non-aquatic living plant and guide said liquid toward the top surface of said growing medium, said support structure and said decorative elements being configured to guide said liquid cascading to said plurality of decorative elements;
    (c) at least one reservoir disposed on said support member and positioned to receive said liquid flowing from said upper position to said lower position;
    (d) a liquid input coupling member for coupling a liquid supply to said upper position;
    (e) a source of light for providing a sunlight substitute to said non-aquatic living plant; and
    (f) a timer device to control the time said light is on.

20. A decorative fountain as in claim 19, further comprising a pH measuring member for monitoring the pH of said flowing liquid.

21. A decorative fountain as in claim 19, wherein said support member is an easel.

22. A decorative fountain as in claim 21, wherein rate of flow of said falling liquid is controlled by a valve.

23. A decorative fountain as in claim 22, further comprising a decorative frame around said display support structure of said support member.

24. A decorative fountain as in claim 23, wherein said decorative element comprises a precast material so configured to resemble vertical ledge found in nature.

25. A decorative fountain as in claim 24, wherein decorative element is further configured and dimensioned to guide the surface flow of said liquid toward said non-aquatic living plant and said liquid also flows due to the capillary action inherent in the rock.

26. A decorative fountain, as in claim 19 further comprising:
    (h) a liquid volume sensing device and control valve attached to said liquid supply;
    (i) a liquid pumping device having an input and an output;
    (j) a pump input coupling member for coupling said reservoir to the input of said liquid pumping device; and
    (k) a pump output coupling member for coupling the output of said liquid pumping device to said upper position;
    (l) a valve disposed on said drain output coupling member to control the draining of said liquid.

27. A decorative fountain, comprising:
    (a) a support member configured to be disposed in a stable upwardly extending position on a wall, said support member comprising a display support structure having an area and having an upper position and a lower position;
    (b) a plurality of decorative elements, disposed throughout the area of said support structure, said decorative elements each defining a recess configured to receive and support a growing medium for a non-aquatic living plant having roots, said decorative elements being configured to generally resemble ledge-like structures found in nature, said decorative elements extending from said support structure and configured to guide the surface flow of an aqueous liquid in a direction extending across the flow of said liquid under the influence of gravity and momentum into direct contact with said growing medium, and to fall in a cascade to said decorative elements from said upper position to said lower position on said support structure toward said non-aquatic living plant, said surface flow of said liquid being fed by a falling flow of said liquid and said decorative element disposed on said support structure, said decorative element being configured and dimensioned to guide a falling liquid from said upper position on said decorative elements to said lower position on said decorative element, and said decorative elements defining channels to allow water to flow away from said roots by gravity;

(c) at least one reservoir disposed on said support member and positioned to receive liquid flowing from said lower position;

(d) a liquid pumping device having an input and an output;

(e) an input coupling member for coupling said reservoir to the input of said liquid pumping device; and (f) an output coupling member for coupling the output of said liquid pumping device to said upper position.

28. A decorative fountain, comprising:

(a) a support member configured to rest in a stable upwardly extending position on a wall and having a display support structure integral with said support structure;

(b) a decorative element disposed on said support structure, said decorative element being configured and dimensioned to guide a falling water from an upper position on said decorative element to a lower position on said decorative element;

said decorative elements extending from said support structure and defining recessed configured and dimensioned to support a growing medium and non-aquatic plants;

(c) at least one reservoir disposed on said support member and positioned to receive water flowing from said lower position and accumulate the same in a volume defined by said reservoir;

(d) an input coupling member for coupling said water from said volume to said upper position; and (e) a water volume sensing device disposed within said volume, said water sensing device being couple to a control valve attached to a water supply to replenish water in said reservoir lost as a result of evaporation or other causes.

29. A decorative fountain as in claim 28, further comprising at least one source of light for providing a sunlight substitute to said non-aquatic living plant.

\* \* \* \* \*